Feb. 10, 1931. G. R. ETTLES 1,792,366
FISH LURE
Filed Aug. 7, 1928 2 Sheets-Sheet 1
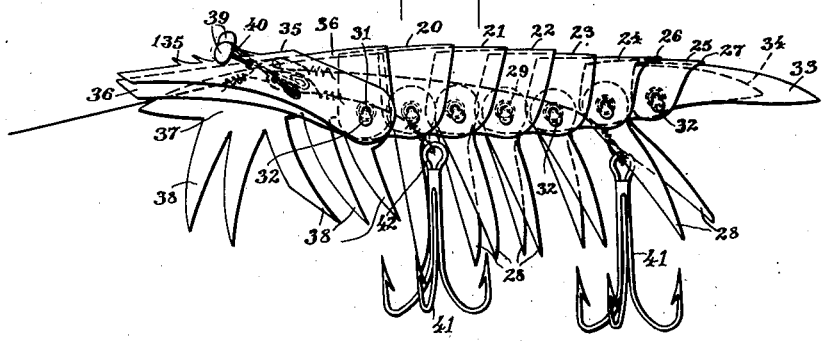
Fig. 1.
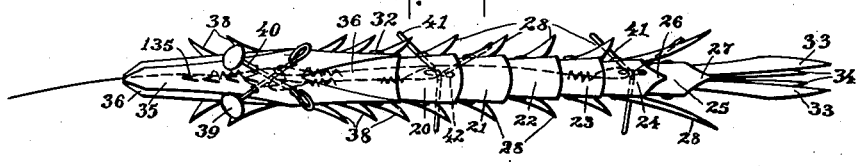
Fig. 2.
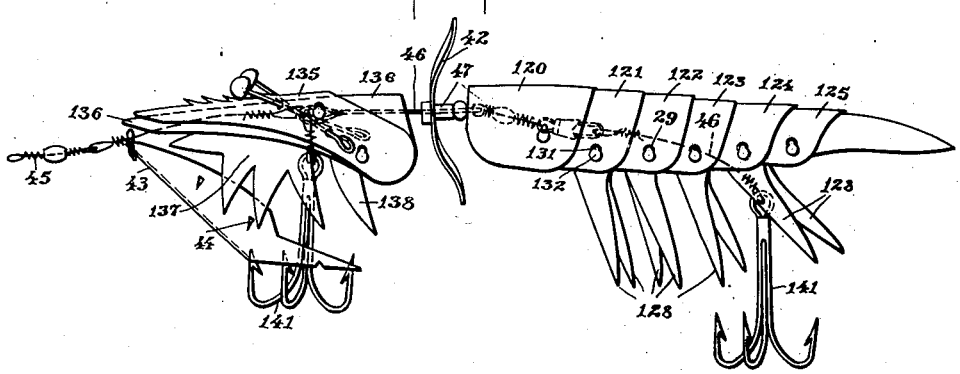
Fig. 3.
WITNESSES
INVENTOR
George R. Ettles
BY 
ATTORNEY Feb. 10, 1931.  G. R. ETTLES  1,792,366
FISH LURE
Filed Aug. 7, 1928    2 Sheets-Sheet 2
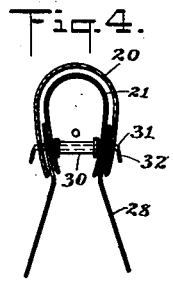
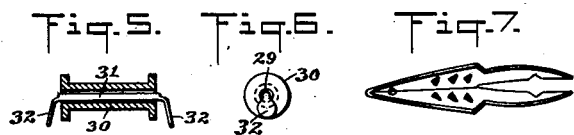
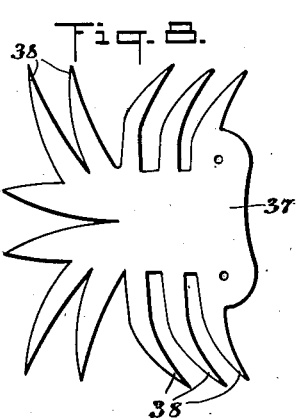
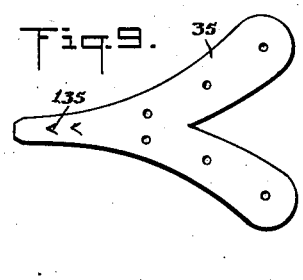
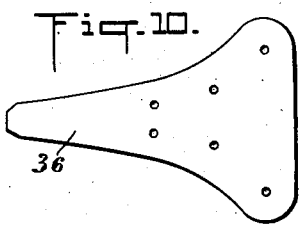
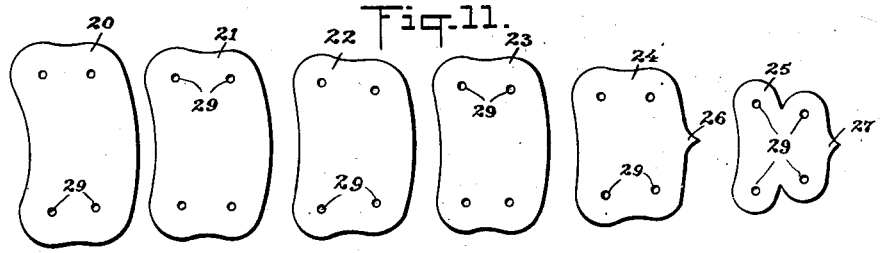
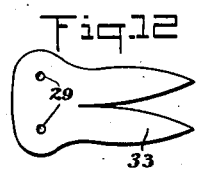
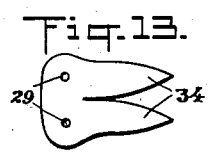
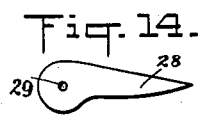
WITNESSES
INVENTOR
George R. Ettles
BY
ATTORNEY Patented Feb. 10, 1931

1,792,366

UNITED STATES PATENT OFFICE

GEORGE R. ETTLES, OF SOUTH JACKSONVILLE, FLORIDA

FISH LURE

Application filed August 7, 1928. Serial No. 298,030.

My invention relates to an artificial fish lure and particularly to a fish lure simulating a shrimp.

The general object of my invention is to provide a novel lure of the indicated character composed of transparent material and an assemblage of parts made sufficiently in imitation of the natural shrimp to make the lure effective in attracting fish.

The nature of my invention and its distinguishing features and advantages will more clearly appear as the description proceeds.

Reference is to be had to the accompanying drawings forming part of this specification, it being understood that the drawings are merely illustrative of examples of the invention.

Figure 1 is a side elevation of a shrimp-like fish lure embodying my invention;

Figure 2 is a plan view thereof;

Figure 3 is a side elevation of the invention in another form;

Figure 4 is a cross section on the line 4—4 of Figure 1;

Figure 5 is a detail in cross section taken through one of the spacer elements and fastening means associated with the body elements;

Figure 6 is an end view of the device shown in Figure 5;

Figure 7 is a plan view of a part disposed at the head of the lure and to be hereinafter referred to;

Figure 8 is a view of a blank for forming the under side member disposed at the head of the lure;

Figures 9 and 10 are plan views of the blanks for forming certain elements entering into the head of the lure;

Figure 11 represents the blanks for forming the overlapping body elements hereinafter referred to;

Figure 12 is a view of one of the blanks for forming one of the elements entering into the tail of the lure;

Figure 13 is a view of a blank for forming another element entering into the formation of the tail of the lure;

Figure 14 is a side view of one of the elements simulating one of the members at the under side of the natural shrimp.

In carrying out my invention in practice, body elements 20 to 25 are formed from the blanks shown in Figure 11, said body elements being of U-shape to arch over the top of the lure. The rearmost element has a pointed rear end 27, and next to the rearmost element is a similarly pointed terminal 26 at the center.

In association with the body elements are elements 28 disposed at opposite sides of the lure. Elements 20 to 25 have transverse holes 29. The upper ends of the elements 28 are disposed between the overlapping portions of the adjacent body elements, such for example as 20, 21 shown in Figure 4.

Spacers 30 are provided at the forward end of each body element 20 to 25, said spacer elements having a through bore through which fasteners 31 are passed, the ends of the fastening elements being bent as at 32 to prevent disassembling of the parts. The fastening element 32 which secures the head to the body serves for substituting heads of different fish besides the head of a shrimp, as the bent fastening elements permit of the said elements being readily removed and replaced.

A tail element 33 is provided and a similarly formed but smaller element 34, both elements 33 and 34 being flexibly secured by the rearmost fastener 31.

At the head of the lure a plurality of members are provided, the uppermost member 35 being shown separately in Figure 9, and has spurs 135 to promote the effective simulation of the natural shrimp. Directly beneath the top element 35 at the head is an element 36, and at the under side of the head is an element 37 formed with a plurality of winglike members 38 simulating certain members on the real shrimp. Elements 35, 36 and 37 are fastened to the foremost members by fastening elements 31 previously described in connection with the members 20 to 25.

Eyes 39 are provided on the forwardly inclined wire shanks 40. The numeral 41 indicates gang hooks suitably hung as at 42 at the under side of the lure.

In Figure 3 is shown another form of the invention in which the forward or head portion of the lure is separated from the rear portion, said front and rear portions being formed substantially as in the previously described construction, the separation being in front of the forward body element 120. The body elements 120 to 125 in Figure 3 correspond to the body elements 20 to 25 in the previously described construction; elements 135, 136 and 137 in Figure 3 correspond to elements 35, 36 and 37 in all essentials as previously described; and elements 128 correspond to elements 28 as in the first described construction. Elements 128 are fastened to body elements 131 corresponding with fasteners 31 and having bent ends 132. The gang hooks in Figure 3 are numbered 141. Between the separated front and body portions of the lure a rotor 42 of bright metal may be employed as shown.

In Figures 3 and 7 is shown an element which may be employed at the front of the lure and made luminous by an application of luminous paint or an attractive color paint. Said element is designated 43 and has spurs 44, the element being positioned in front of the forward gang hook 141. Any suitable means for attaching the hooks may be shown, there being indicated a snell or leader 45 associated with a wire running through the lure and through a swivel 47 between the front and rear portions of the lure. The gang hooks are fastened in any suitable manner, as for example to a wire 46.

The hollow and transparent form of the above described lure lends itself to the employment of colored rags adapted to be placed inside of the body of the lure to make it attractive to certain fish, or to fish in certain seasons.

I would state furthermore that while the illustrated examples constitute practical embodiments of my invention, I do not limit myself strictly to the exact details herein illustrated, since, manifestly, the same can be considerably varied without departure from the spirit of the invention as defined in the appended claims.

I claim:

1. A fish lure in imitation of a shrimp, composed of a series of body members arched over the top of the lure and flexibly connected, head and tail portions, and depending members on each side of the body members, and extending approximately throughout the length of the body of the lure.

2. A fish lure in imitation of a shrimp, composed of a series of body members arched over the top of the lure and flexibly connected, head and tail portions, and depending members on the body, said depending members being fastened by the means forming the flexible connection between the body members.

3. In an artificial lure in simulation of a shrimp, elements simulating the body of a shrimp, elements simulating the tail portion of a shrimp, a plurality of elements forming the front portion of the lure and disposed one above another, and a plurality of elements depending from each side of the body and front portion.

4. In an artificial lure in simulation of a shrimp, elements simulating the body of a shrimp, elements simulating the tail portion of a shrimp, a plurality of elements forming the front portion of the lure and disposed one above another, and elements depending from the body and front portion, all the elements in the lure being transparent.

5. In an artificial fish lure in imitation of a shrimp, elements simulating the body of a shrimp, elements simulating the tail portion of a shrimp, and a plurality of elements forming the front portion of the lure and disposed one above another, all the elements in the lure being transparent; together with depending members on the lowermost element on the front portion in simulation of corresponding members on the natural shrimp.

6. In an artificial fish lure, elements simulating the parts of a natural shrimp, the front portion being separated from the rear portion, hoops depending from the lure, and a separate element extending downwardly beneath the front portion of the lure and in front of the foremost hooks, said elements being free to have independent movement having luminosity.

7. In an artificial fish lure, a plurality of approximately U-shaped elements disposed in overlapping engagement, means for connecting the members of the elements together, and oppositely disposed depending members having their upper ends secured between the overlapping portions of the elements by the connecting means of said elements.

8. An artificial fish lure, comprising a body formed of a plurality of approximately U-shaped overlapping elements, depending members secured between the overlapping portions of the elements, tail elements secured to the rearmost body element, and a head portion secured to the body and comprising a plurality of superimposed elements, one of which is provided with wing-like members.

9. An artificial fish lure, comprising a body formed of a plurality of approximately U-shaped elements, means for connecting the members of the elements together, depending members secured between the overlapping portions of the elements by the connecting means of said elements, tail elements secured to the rearmost body element by its connecting means, and a head portion formed of a plurality of elements secured to the body, the lowermost element being provided with wing-like members.

10. An artificial fish lure, comprising a body formed of a plurality of approximately U-shaped overlapping elements, members depending from the said elements, tail elements secured to the rearmost body element, and a front portion secured to the body, said front portion comprising a plurality of superimposed elements, the lowermost one of which is provided with wing-like members, and forwardly inclined wire shanks provided with eyes at their ends.

11. In an artificial fish lure, a plurality of approximately U-shaped overlapping elements having their side members apertured, tubular spacing members and bendable securing members passed through the said apertures and the spacing members and having their ends bent down upon the U-shaped elements.

GEORGE R. ETTLES.